United States Patent [19]

Kountz

[11] Patent Number: 4,608,833
[45] Date of Patent: Sep. 2, 1986

[54] SELF-OPTIMIZING, CAPACITY CONTROL SYSTEM FOR INVERTER-DRIVEN CENTRIFUGAL COMPRESSOR BASED WATER CHILLERS

[75] Inventor: Kenneth J. Kountz, Palatine, Ill.

[73] Assignee: Borg-Warner Corporation, Chicago, Ill.

[21] Appl. No.: 685,685

[22] Filed: Dec. 24, 1984

[51] Int. Cl.$^4$ .............................................. F25B 1/00
[52] U.S. Cl. ..................................... 62/228.1; 62/201; 364/151
[58] Field of Search ................. 62/217, 185, 201, 203, 62/204, 229, 230, 208, 209, 210, 211, 215, 226, 227, 228.1, 228.3, 228.4, 228.5; 364/557, 558, 151, 150, 149

[56] References Cited

U.S. PATENT DOCUMENTS

| | | | |
|---|---|---|---|
| 4,142,838 | 3/1979 | Staroselsky | 417/20 |
| 4,151,725 | 5/1979 | Kountz et al. | 62/228.5 X |
| 4,249,238 | 2/1981 | Spang, III et al. | 364/151 |
| 4,282,719 | 8/1981 | Kountz et al. | 62/228.1 X |
| 4,490,791 | 12/1984 | Morrison | 364/151 X |

Primary Examiner—Harry Tanner
Attorney, Agent, or Firm—James E. Tracy

[57] ABSTRACT

A self-optimizing, capacity control system for a refrigeration system including a compressor, a condenser, and an evaporator, all connected in a closed refrigeration circuit is provided. The compressor includes a plurality of adjustable inlet guide vanes, a motor connected to regulate the inlet guide vanes position and an electrical speed motor connected to drive the compressor. The self-optimizing capacity control system includes a microprocessor responsive to continual measurements of a PRV signal, a compressor head signal, a motor current signal and a motor speed signal for determining both the compressor speed and the position of the inlet guide vanes to define a current operating point in an initial surge surface array stored in a random-access memory. The microprocessor will initiate a "learning" mode in which the compressor motor speed will continually be decreased incrementally and the PRV will be moved to a more open position until an operating point is found where the compressor is surging. The microprocessor will update the initial surge surface array stored in the random-access memory with the latest surge conditions. Then, the microprocessor will initiate an "operating" mode in which the PRV are moved to a position responsive to a temperature error signal related to the difference between the chilled water temperature and the temperature set point and the compressor speed is set a safety margin away from the surge speed.

12 Claims, 7 Drawing Figures

SELF-OPTIMIZING, CAPACITY CONTROL SYSTEM FOR INVERTER-DRIVEN CENTRIFUGAL COMPRESSOR BASED WATER CHILLERS

BACKGROUND OF THE INVENTION

1. Field of the Invention:

This invention relates generally to refrigeration systems and more particularly, it relates to a self-optimizing, capacity control system for inverter-driven centrifugal compressor based water chillers wherein adjustable inlet guide vanes and compressor speed are both automatically regulated in response to a continually updated "learned" chiller surge surface so as to realize minimum overall chiller energy consumption.

2. Description of the Prior Art:

In the art of inverter-driven chillers, it is generally known that the most efficient operating conditions are met when the chiller is operating at an operating point which has the combination of the lowest compressor speed and more open PRV position. However, the surge surface of the chiller restricts the degree to which the lowest speed and larger vane openings combination can be established. Thus, it should be clear that the objective of capacity control is to operate the chiller at the lowest, surge free, compressor speed possible, but yet still supplies the load and head requirements. In certain prior art attempts, approximations to the chiller surge surfaces are factory set by means of pre-stored surge surface equations contained in a capacity control unit. Since the surge surface for a particular chiller are not constant all the time and changes under certain conditions due to factors such as tube cleanliness, compressor aging, and drifts in transducers or sensors used for detecting PRV position, condenser pressure, and evaporator pressure, the use of constant pre-stored surge surface equations do not take into consideration these varying conditions.

It would therefore be desirable to provide a self-optimizing, capacity control system for inverter-driven centrifugal compressor based water chillers which continually adjusts itself for varying conditions affecting the surge surfaces so as to operate at minimum overall energy consumption.

U.S. Pat. No. 4,151,725 which issued on May 1, 1979 there is disclosed a capacity control system wherein the compressor head value was inferred from the difference between the temperature of liquid refrigerant leaving the condenser and the temperature of the saturated refrigerant leaving the evaporator. This temperature difference was utilized with the control system to regulate both the means for adjusting the position of the guide vanes and the means for driving the compressor. However, the assumed linearity of the function between the isentropic compressor head parameter $\Omega$ and the difference between the condensing and the evaporating refrigerant temperatures was not to be entirely accurate over the system operation, especially at light loads and at low heads.

In U.S. Pat. No. 4,282,719 which issued on Aug. 11, 1981, there is taught a capacity control system having a more accurate indication of compressor head which even at light loads and low heads, could be determined by a signal that is a function of the expression $(P_{cd}-P_{ev})/P_{ev}$. The numerator of this ratio is derived from the difference between the condenser absolute pressure $P_{cd}$ and the evaporator absolute pressure $P_{ev}$. The denominator of this ratio signal is derived from the evaporator absolute pressure $P_{ev}$.

In co-pending patent application Ser. No. 652,401 which was filed on Sept. 20, 1984, and which issued as U.S. Pat. No. 4,546,618 on Oct. 15, 1985, there is shown a capacity control system for inverter-driven centrifugal based water chillers which includes a microprocessor responsive to continual measurements of a PRV signal, compressor head signal and suction flow signal for regulating both the inlet guide vanes and compressor speed. In another embodiment of this co-pending application, the compressor head signal is replaced with an actual motor speed signal of the compressor. Consequently, the microprocessor in the second embodiment is responsive to the PRV signal, motor speed signal and suction flow signal for regulating both the inlet guide vanes and compressor speed.

However, the two above patents, and co-pending patent application, used pre-stored surge surface equations which are factory set. Thus, these systems did not take into account the varying conditions affecting the surge surfaces. The present invention represents an improvement over these two patents and co-pending patent application, which are all assigned to the same assignee as this application. This invention provides a self-optimizing, capacity control system for inverter-driven centrifugal compressor based water chillers wherein adjustable inlet guide vanes and compressor speed are both automatically regulated in response to a continually updated "learned" chiller surge surface so as to realize the minimum overall chiller energy consumption. This is accomplished by a microprocessor having a random-access memory which periodically identifies the location of the surge surface at the current operating point of the chiller and updates that surge surface information in the random-access memory during a "learning" mode. Then, the microprocessor causes the chiller to operate at a safety margin away from the surge surface during an "operating" mode for minimum energy consumption.

In particular, the present invention uses all of the same input signals to the control system block 50 in the '725 patent except that (1) the condenser temperature from the thermistor 56 is replaced by an absolute condenser pressure signal taken from the transducer 110 on line 111 of '719 patent and (2) the evaporater temperature from the thermistor 58 is replaced by an absolute evaporator pressure signal taken from the transducer 112 on line 113 of the '719 patent. Further, the amplifier 59 of the '725 patent is replaced by a functional generator 104 formed by the blocks 120 and 123 in FIG. 2 of the '719 patent. The substantial improvement of the present invention depends in part upon substituting the electronic circuitry of the control system 50 illustrated in FIG. 6A, 6B and 6C of the '725 patent by a microprocessor having a random-access memory for storing the updated surge surface information.

SUMMARY OF THE INVENTION

Accordingly, it is a general object of the present invention to provide a self-optimizing capacity control system for a refrigeration system wherein the compressor speed and inlet guide vane position are both adjusted automatically in response to a continually updated "learned" chiller surge surface so as to realize minimum overall chiller energy consumption.

It is an object of the present invention to provide a self-optimizing, capacity control system for a refrigeration system which includes a microprocessor having a random-access memory for periodically identifying the location of the surge surface at the current operating point and for updating the surge surface information in the random-access memory during a "learning" mode.

It is another object of the present invention to provide a self-optimizing, capacity control system for a refrigeration system which includes a microprocessor responsive to continual measurements of a PRV signal, a compressor head signal, a compressor motor speed signal, and a motor current signal for setting the compressor speed at a safety margin from the surge speed during an "operating" mode.

In accordance with these aims and objectives, the present invention is concerned with the provision of a self-optimizing, capacity control system for a refrigeration system which includes a compressor, condenser and a evaporator, all connected in a closed refrigeration circuit. The compressor has a plurality of adjustable inlet guide vanes, a motor connected to regulate the inlet guide vanes position, and an electrical variable speed motor connected to drive the compressor. The self-optimizing, capacity control system includes means for sensing the absolute condenser pressure to generate a first signal and means for sensing the absolute evaporator pressure to generate a second signal. There are also provided means for sensing the amplitude of the current flowing in the compressor drive motor to generate a third signal and means for sensing the actual speed of the compressor drive motor to generate a fourth signal. Means for sensing the physical position of the inlet guide vanes is provided to generate a fifth signal. Means for sensing the temperature of the chilled water discharged from the evaporator is provided to generate a sixth signal. Further, there is provided a means for sensing a temperature set point to generate a seventh signal. A microprocessor responsive to the first through the seventh signals generates control signals to regulate automatically both the speed of the compressor drive motor and the position of the inlet guide vanes so as to realize minimum overall chiller energy consumption.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
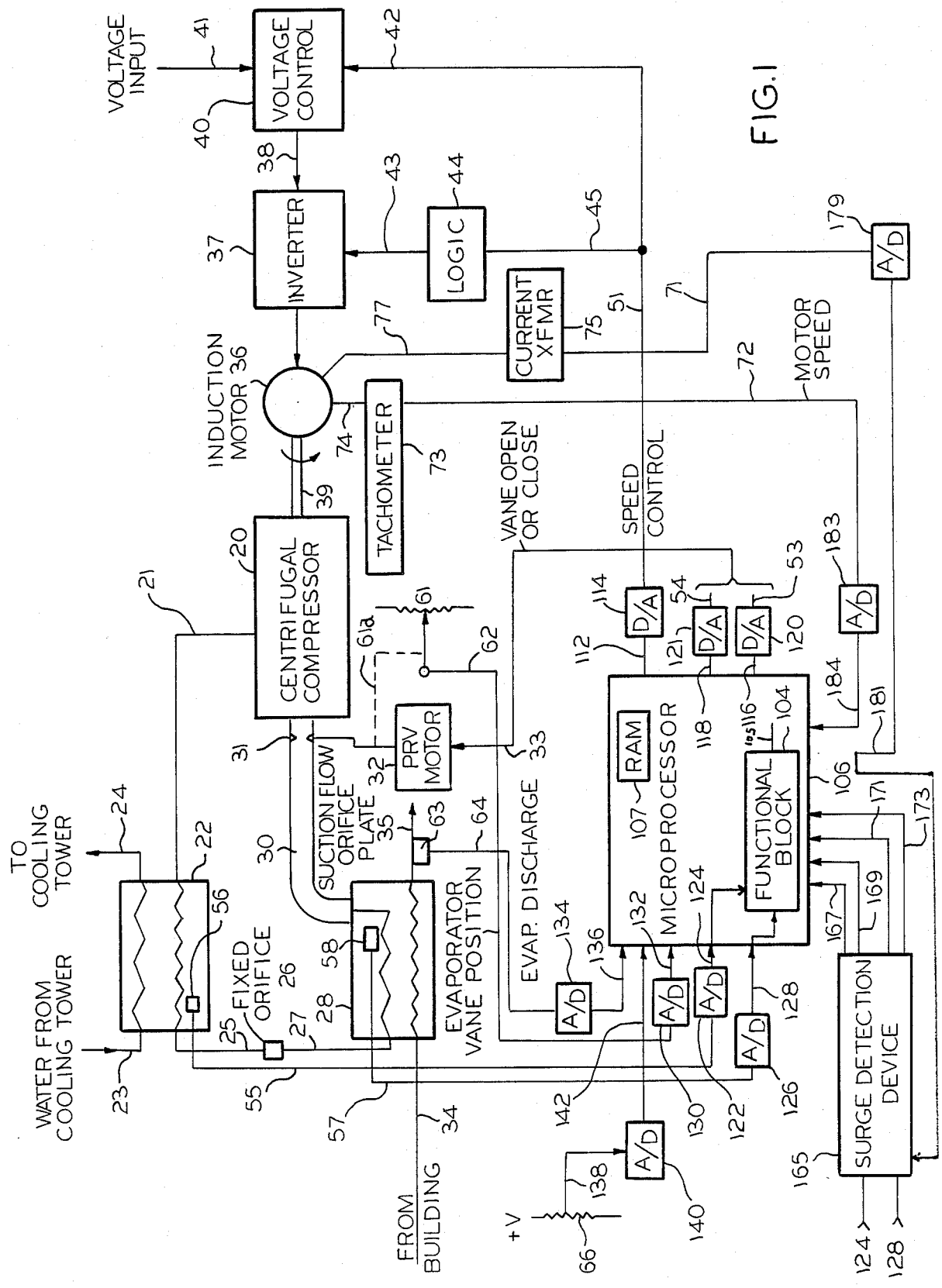
FIG. 1 is block diagram of a self-optimizing, capacity control system of the present invention which includes a microprocessor with a RAM.

Referring now in detail to the various views of the drawings, there is shown in FIG. 1 in block diagram form a refrigeration or cooling system which includes a centrifugal compressor 20 for passing a refrigerant through line 21 to a condenser 22. Water from a cooling tower (not shown) enters on line 23 and leaves on line 24, the water being in heat exchange relationship with the liquid refrigerant in the condenser 22. A refrigerant at the discharge side of condenser 22 is delivered to a fixed orifice 26 via line 25. The outlet of the orifice 26 is passed over line 27 to the refrigerant inlet connection of an evaporator 28. The refrigerant is then passed through the evaporator and out a suction duct 30 having a plurality of inlet guide vanes 31 or pre-rotational vanes (PRV). The position of the guide vanes 31 is regulated by a small PRV motor 32 which receives a control signal on line 33. The higher temperature of water from a building or cooling load (not shown) enters on line 34 and leaves as chilled water on line 35, the building water being in heat exchange relationship with the refrigerant vapor in the evaporator 28.

An electrical prime mover such as an induction motor 36 is coupled over a shaft 39 for driving the centrifugal compressor 20. The motor 36 is in turn driven from an inverter 37 which receives a DC input voltage over line 38 so as to determine the amplitude of the inverter output voltage. A voltage control circuit 40 is provided between a voltage supply line 41 and the line 38 which delivers the DC input voltage to the inverter 37. The frequency of the inverter output voltage is regulated by the periodicity of timing or gating signals appearing on line 43 from a logic circuit 44. As is well known, a regulating input signal through the logic circuit on line 45 may be a DC voltage for controlling a voltage-controlled oscillator in the logic circuit to provide output pulses at a freqency determined by the amplitude of the signal on line 45. The logic circuit generally includes a ring counter-type circuit to distribute the impulses to the switching means such as thyristors in the inverter 37.

As described thus far, the components of the present refrigeration system are quite conventional in nature and are the same components as shown in FIG. 1 of U.S. Pat. No. 4,151,725 which is hereby incorporated by reference. The substantial improvement of the present invention depends in part upon the provision of a microprocessor 106 with random-access memory (RAM) 107 which is utilized to automatically regulate both the speed of the induction motor 36 via line 51 and the physical position of the pre-rotational vanes 31 via line 33 so as to realize minimum overall chiller energy consumption. The vane control signal on line 33 can be either an "open vanes" signal on line 53 or a "closed vanes" signal on line 54, or no signal ("hold vanes"). As can be seen, the output speed control signal from the microprocessor 106 on line 112 is fed through a digital-to-analog (D/A) converter 114 for supplying the line 51. The vane position control signals from the microprocessor 106 on lines 116 and 118 are fed through respective D/A converters 120 and 121 for supplying the respective lines 53 and 54. These output control signals are derived from various input signals which will now be described.

A first input signal on line 55 is provided by a first pressure transducer 56 and is a function of the absolute pressure in the condenser 22. A second input signal on line 57 is obtained from a second pressure transducer 58 and is a function of the absolute pressure in the evaporator 28. The first input signal is fed through analog-to-digital (A/D) converter 122 for driving the microprocessor 106 via line 124. The second input signal is fed through A/D converter 126 for driving the microprocessor 106 via line 128. The pressure transducers 56, 58 are the same type as pressure transducers 110 and 112 described in FIG. 1 of U.S. Pat. No. 4,282,719 which is hereby incorporated by reference.

A third input signal on line 71 which is representative of the amplitude of the current flowing through the winding of the induction motor 36. This motor current signal is fed through A/D converter 179 for driving the microprocessor 106 via line 181. This motor current signal may be derived from a current transformer 75 connected to the motor 36 via a line 77. The first, second and third input signals representative of the respective condenser pressure, evaporator pressure and motor current define input signals for surge detector means 165 for the chiller of the present invention as will be explained in more detail later.

A fourth input signal on line 72 is provided which is representative of the actual motor speed of the induction motor 36. This motor speed signal is fed to A/D converter 183 for driving the microprocessor 106 via line 184. It should be understood that the actual motor speed can be derived via a conventional tachometer 73 connected to the motor 36 via a line 74.

A fifth input signal on line 62 is provided by a potentiometer 61 with its movable arm or wiper mechanically coupled to the output shaft of the PRV motor 32 as indicated by the dotted lines 61a. Therefore, this fifth input signal indicates (i.e., wide open vanes—WOV, ¾ open, ½ open and so forth) of the inlet guide vanes 31 in a continuous manner. The fifth signal is fed through A/D converter 130 for driving the microprocessor 106 via line 132. A sixth input signal on line 64 is obtained from a thermistor 63 positioned to sense the temperature of the chilled water discharged from the evaporator 28. This sixth signal represents the instantaneous load condition and is fed through A/D converter 134 for driving the microprocessor 106 via line 136. A seventh input signal on line 138 is obtained from a potentiometer 66 and represents a temperature set point or desired condition signal. This seventh signal is fed through A/D converter 140 to the microprocessor 106 via line 142.

In order to provide an understanding of the general overall operation of the present invention, reference is now made to Table I of the Appendix which summarizes how the microprocessor regulates the compressor speed and PRV position in the surge surface during a "learning" mode and during an "operating" mode. As can be seen, there exists a wide open vane (WOV) region and a partly open vane (POV) region for each mode. In the WOV region of the "learning" mode, there are no surge surfaces to be learned since the PRV are wide open and thus no other combinations exists for a lower speed and more open vane position. Consequently, any reduction in compressor speed will cause a lower chiller capacity and a higher leaving chilled water temperature.

Figure 2:
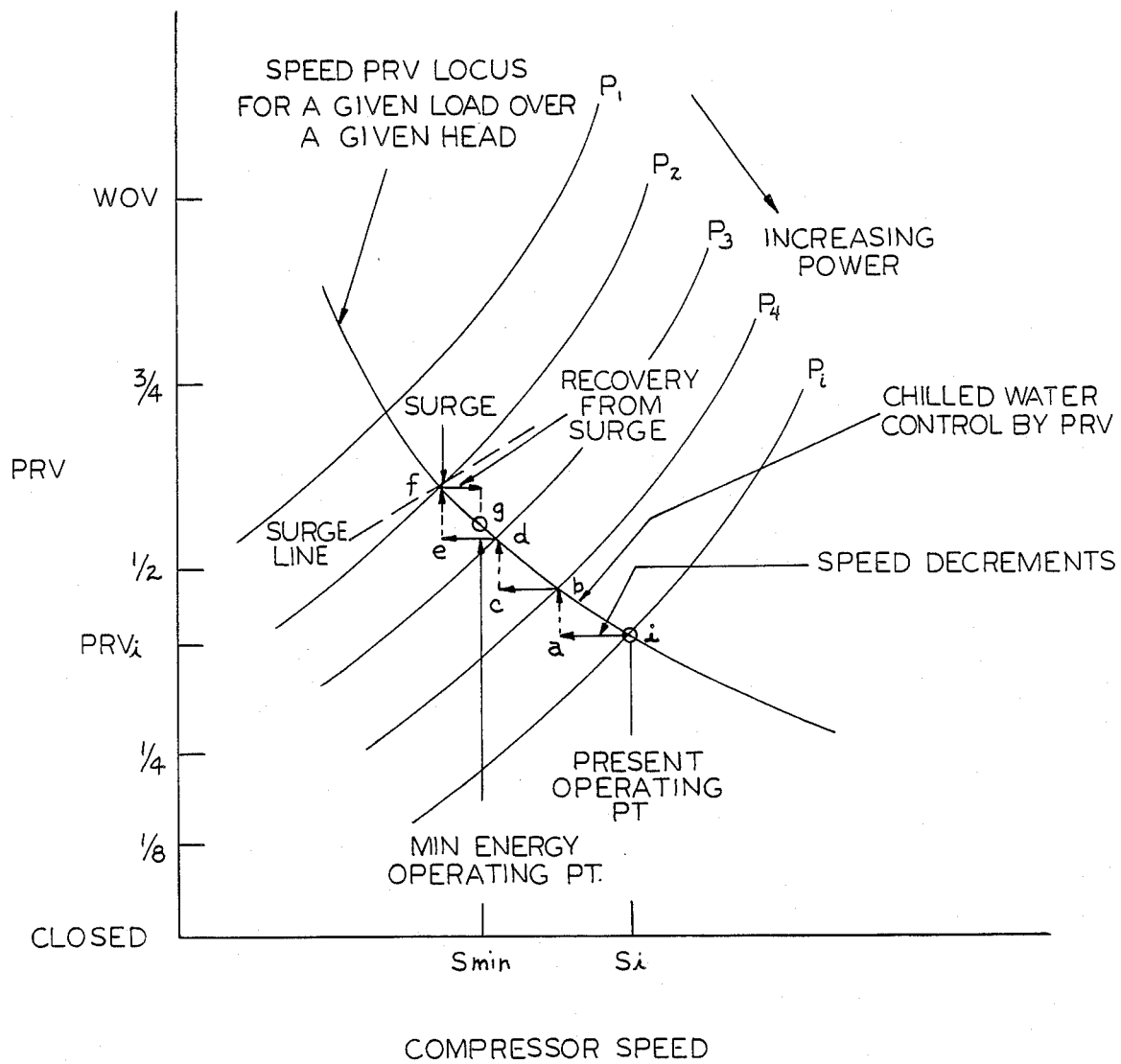
FIG. 2 is a graphical illustration useful in understanding the operation of the present invention in the partly open vane region of a "learning" mode.

Reference now made to FIG. 2 of the drawings which is a graphical illustration useful in understanding the operation of the present invention in the POV region of the "learning" mode. FIG. 2 depicts how lines of constant chiller power appear on a chart where the PRV setting is plotted along the left ordinate and the compressor speed is plotted along the abscissa. For example, if the PRV setting is equal to the $PRV_i$ and the compressor speed is equal to $S_i$, there is defined a particular operating point "i". Prior to initiation of "learning mode", the microprocessor will determine the current operating point in an initial surge surface array from the various input signals. The method for generating the initial surge surface array which is stored in a random-access memory (RAM) 107 of the microprocessor 106 will be explained hereinafter.

Upon start-up of the "learning mode", the microprocessor will lower incrementally the compressor speed such as by approximately 0.1 hz to a point "a". Then, with the speed being held constant the chilled water temperature control is closed by moving of the PRV to a point "b" so that the error in the water temperature is within ±0.1° F. from the water set point temperature. This process is continually repeated along point "c", "d", "e", and "f" until a surge is detected at the point "f". The current surge surface array stored in the RAM is now updated with the detected surge conditions or information relative to the PRV position, compressor speed, and pressure ratio. Finally, the microprocessor will suspend the "learning" mode and activate the normal "operating" mode which now will be described.

In the WOV region of the "operating" mode, the PRV are held in a fully opened position and the compressor speed is increased or decreased so as to meet the load requirement by maintaining constant the leaving chilled water temperature. If a reduced load requires a lower capacity, the microprocessor will shift to the partly open vane region of control. In the POV region of the "operating" mode, errors in the chilled water temperature are controlled by changing both the PRV position and the compressor speed. The primary chiller capacity control is accomplished by adjusting the PRV position. The PRV are moved to a more open position if a chiller capacity is increased and to a more closed position if the chiller capacity is decreased.

The secondary chiller capacity control is accomplished by adjusting the compressor speed so as to increase or set it at a safety margin, such as 0.5 hz to a point "g" in FIG. 2, away from the surge speed as determined from the latest surge surface during the "learning" mode. It should be understood that the compressor speed is a function of the PRV position and the head measurement (approximated by the pressure ratio). Thus, this point "g" defines the minimum energy operating point which is surge free and still satisfies the load and head requirements.

Figure 3:
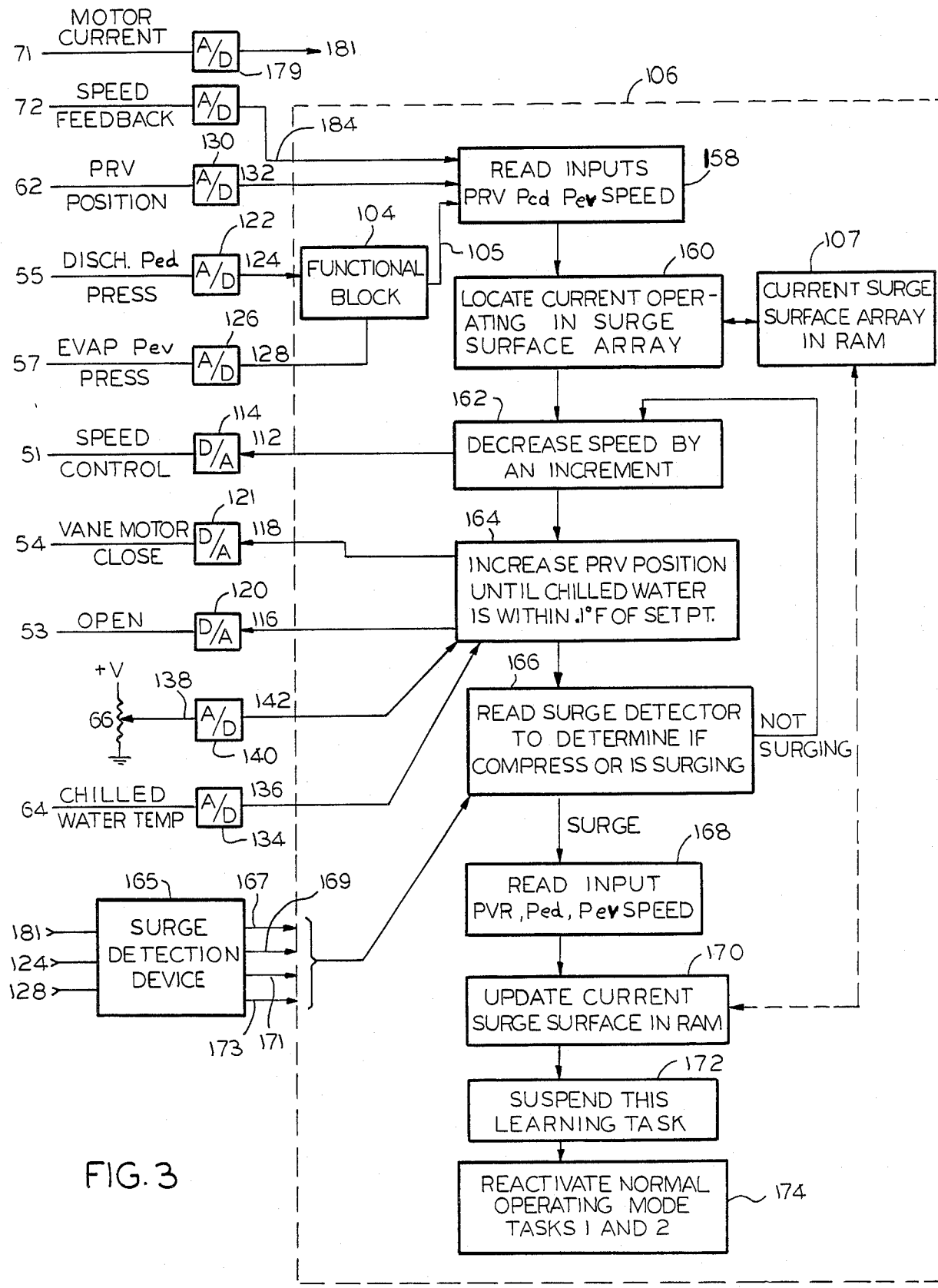
FIG. 3 is a more detailed diagram illustrating the microprocessor of FIG. 1 by way of a flow chart during a "learning" mode.

The details of the microprocessor required to perform the function just described with respect to the "learning" mode portion of Table I is shown in FIG. 3 in a flow chart fashion. The microprocessor 106 includes a functional block 104 which receives the first input signal representative of the absolute condenser pressure from line 124 and the second input signal representative of the absolute evaporator pressure from line 128. The functional block 104 produces on it output line 105 a signal which is a ratio. This ratio signal is the same as the signal represented on line 124 in FIG. 2 of the '719 patent. A block 158 receives this ratio signal on line 105 which is indicative of the compressor head. The input signal representative of the motor speed on the line 184 is also received by the block 158. Further, a fifth input signal representative of the vane position on the line 132 is fed to the block 158.

From all of these inputs, a block 160 locates the current operating point such as the point "i" of FIG. 2. The surge array is stored in the RAM 107. Once the operating point is located, the compressor speed is incrementally decreased in speed by a speed block 162. This output speed control signal on the line 112 from the block 162 is utilized to regulate the speed of the induction motor 36 via the D/A converter 114 and the line 51.

A block 164 receives the sixth input signal representative of the instantaneous load condition from line 136 and the seventh input signal from line 142 representative of the desired condition. The block 164 is used to increase or open the position of the vanes so that an error between the chilled water temperature and the temperature set point is within point 0.1° F.

A surge detector block 166 in response to the surge detection device 165, which is provided as part of the present control system, determines whether the centrifugal compressor is in the surge condition. This surge detection device 165 may be the same the surge detection apparatus 10 of FIG. 1 taught in copending U.S. patent application Ser. No. 685,686, which was filed on Dec. 24, 1984 in the names of Madeleine M. Lowe and Robert T. Hagerman and assigned to the same assignee as the present invention. In this copending application which is hereby incorporated by reference, the surge detection apparatus 10 receives as input signals a motor current signal obtained from a current transformer 24 connected in a phase line 26 of an induction motor 20, a condenser pressure signal obtained from a first pressure transducer 32 connected to the discharge line of the condenser 14, and an evaporator pressure signal obtained from a second pressure transducer 34 connected to the suction side of the compressor. The device 165 receives these corresponding input signals on respective lines 181, 124 and 128. In response to these input signals, the apparatus 10 generates as output signals a filtered motor current signal on line 63, a filtered differential pressure signal on line 60, a filtered current threshold signal on line 70 and a filtered differential pressure threshold signal on line 72. The device 165 generates these corresponding output signals on lines 167, 169, 171 and 173 which are fed to the microprocessor 106.

The surge detector block 166 in the microprocessor 106 depicted in FIG. 3 of the present invention is formed in the manner as the flow chart shown in FIG. 2 of the aforementioned copending application. Thus, the block 166 will indicate that the compressor is surging when the differential pressure threshold and current threshold signals are exceeded within a pre-selected time interval.

If a surge condition does not exist, the process of decreasing the compressor speed is repeated via the block 162 until a surge condition exists. At the surge condition, a block 168 reads the PRV position, condenser pressure, evaporator pressure, and compressor speed. This new information is updated by a block 170 for storing in the RAM 107. Thereafter, blocks 172 and 174 causes discontinuation of the "learning" mode and activates the normal "operating" mode of the system, respectively.

Figure 4:
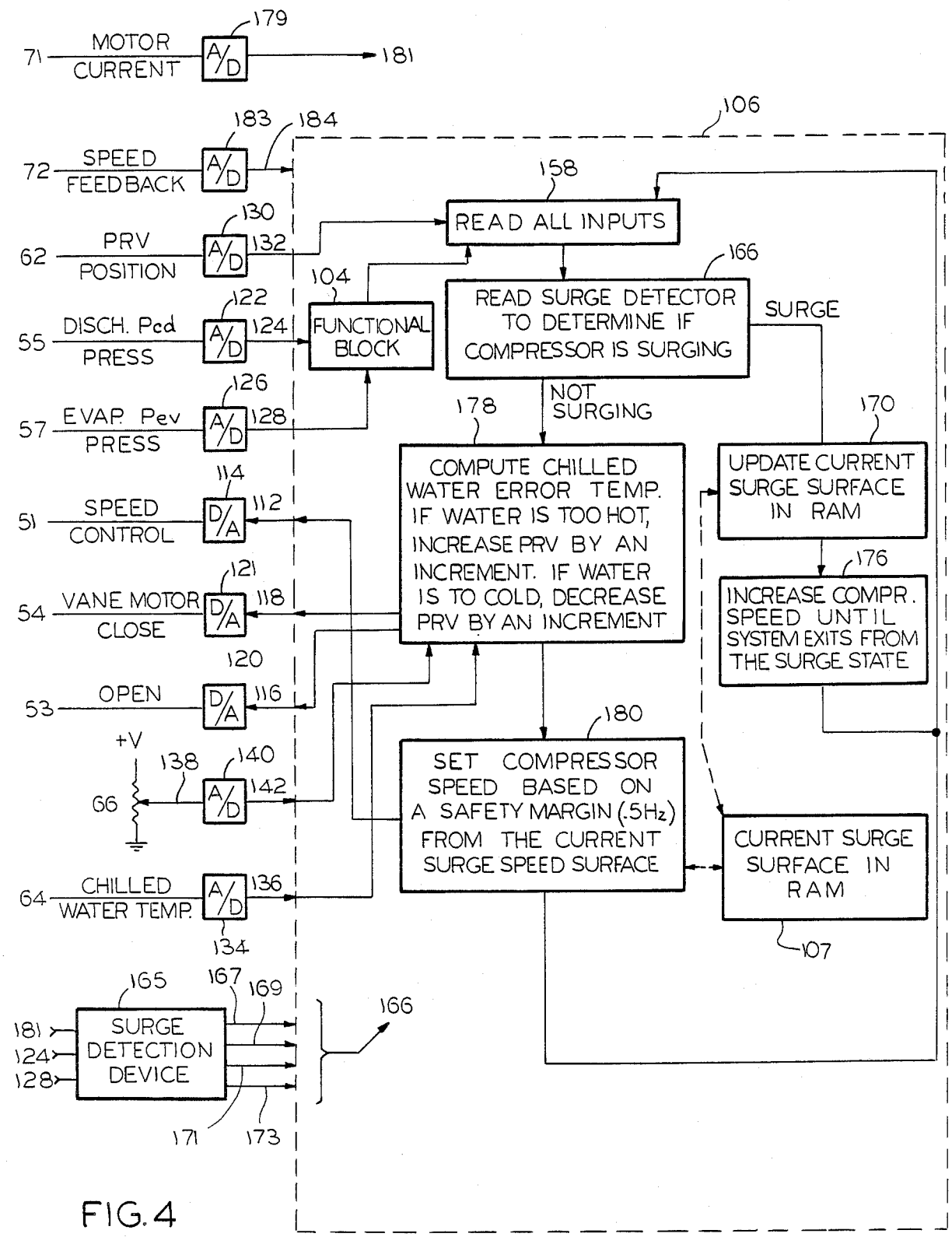
FIG. 4 is a more detailed diagram illustrating the microprocessor of FIG. 1 by way of a flow chart during an "operating" mode.

Similarly, the details of the microprocessor 106 required to perform the function previously described with respect to the "operating" mode portion of Table I is shown in FIG. 4 in a flow chart fashion. A block 176 increases the compressor speed until the system is no longer in the surge condition. Once it is determined that the compressor is not surging by block 166, a block 178 will open the position of the vanes if the chilled water temperature is determined to be too hot by the "open vanes" control signal on line 116. On the other hand, if the chilled water temperature is too cold, the block 178 will cause the position of the vanes to close by the "closed vanes" control signal on line 118. These same control signals are used to regulate the PRV motor 32 via the line 33. Subsequently, the compressor speed is increased a safety margin such as 0.5 hz from the current surge speed surface stored in the RAM 107. This is accomplished by the output speed control signal on the line 112 from the block 180 which is utilized to regulate the speed of the induction motor via the DA converter 114 via the line 51.

Figure 5:
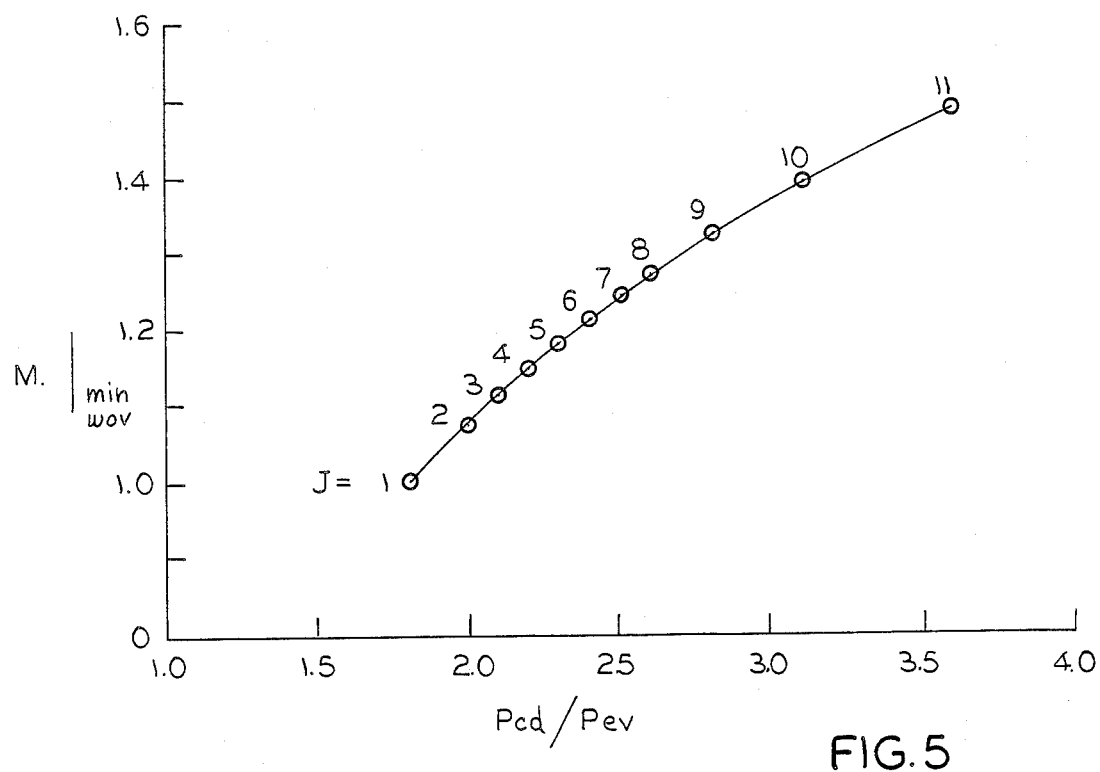
FIGS. 5 and 6 are graphical illustrations useful in understanding the operation of the present illustration.
Figure 6:
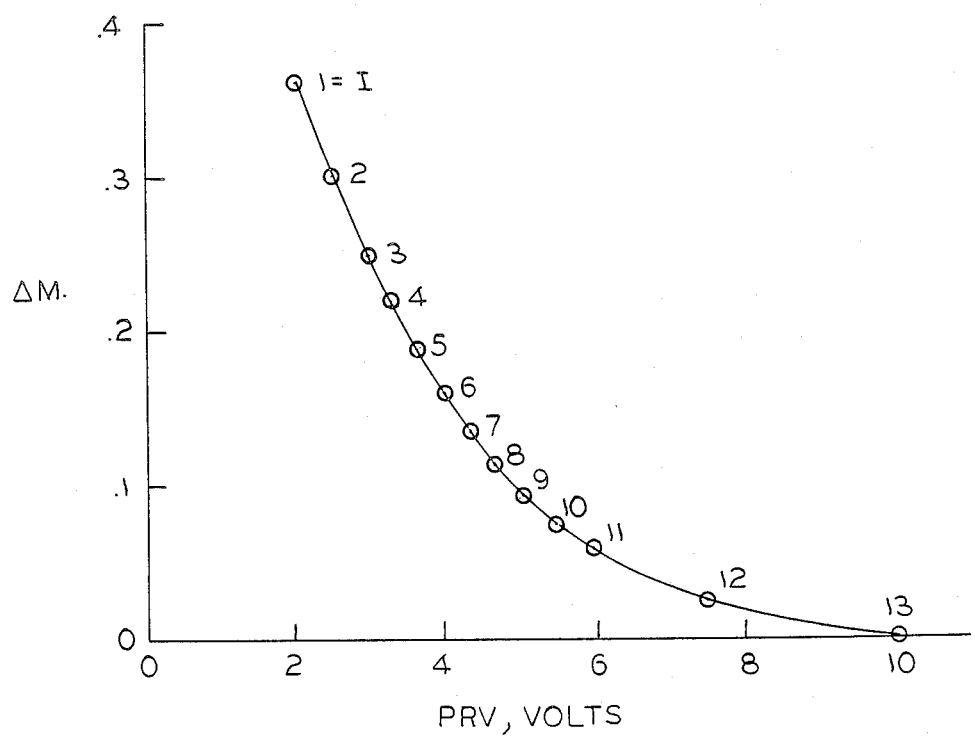
Figure 7:
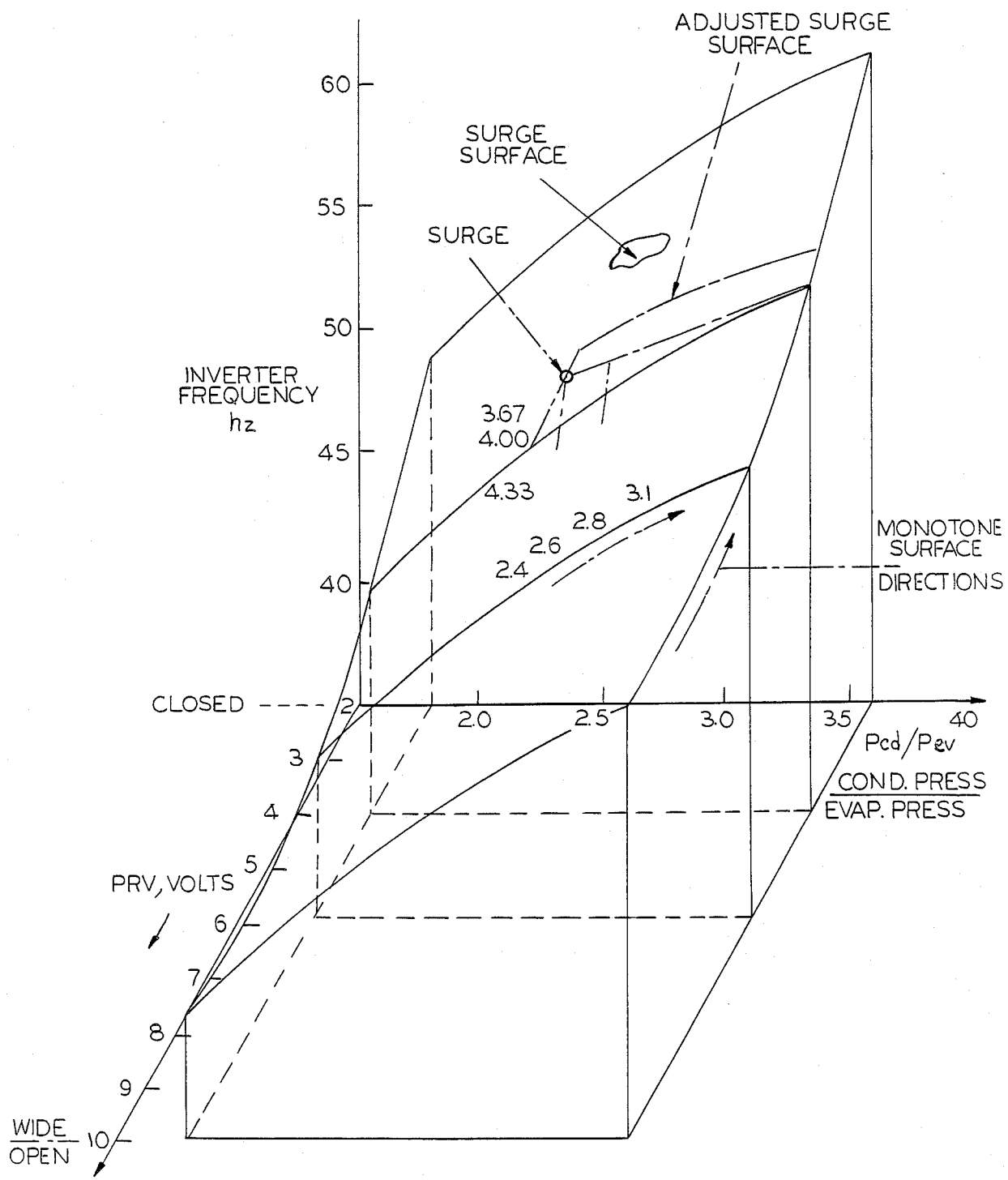
FIG. 7 is a graph depicting a typical initial chiller surge surface and an adjusted surge surface.

The method of generating the initial approximation to the surge surface for any variable speed chiller will now be explained. It is generally known to those skilled in the art that a minimum Mach number $M_o$ representative of compressor speed at wide open vanes is a function of the pressure ratio over the compressor. The average values of actual measurements obtained from commercially available chillers during experimentation can be plotted to generate the graphical illustration of FIG. 5. Further, it is also known that a speed correction referred to as "speed boost" $\Delta M_o$ is required to be made in the POV region of control for the minimum Mach number at WOV to formulate correctly the surge surface. Similarly, the average values of actual measurement of "speed boost" and PRV positions can be plotted to generate the graphical illustration of FIG. 6. By combining the Mach number relationship from FIGS. 5 and 6 and defining the Mach number at 60 Hz inverter frequency to be equal to 1.5, the initial surge surface speed array can be generated and shown in Table II of the Appendix. In Table II, the columns are designated by the pressure ratio $P_{cd}/P_{ev}$ while the rows are designated by PRV position with 2.00 volts corresponding to the closed vane position and 10.00 volts corresponding to the wide open vane position. The tabulated surge surface speed are scaled such that 9.99 volts corresponds to 60 hz inverter frequency. Further, this information can be plotted to provide a typical initial surge surface which is illustrated in FIG. 7 of the drawings. This initial surge surface is the one stored initially in the RAM 107 of the microprocessor.

The accuracy of this initial surge surface is not required since an updated point on the surge surface will be "learned" during the "learning" mode. From this, the microprocessor will adjust all of the values in the surge surface array and calculate a new surge surface. For example, an adjusted surge surface is shown as a dot-dash line in FIG. 7 which illustrates a surge speed that is above the previously "learned" surface.

For completeness in the disclosure of the above described system but not for purposes of limitation, there is listed in Table III the functions of each task for the microprocessor in performing the various control and surge learning and detecting features of the present invention.

From the foregoing detailed description, it can best be seen that the present invention provides a self-optimizing, inverter-driven centrifugal compressor based water chiller control system wherein adjustable inlet guide vanes and compressor speed are both automatically regulated in response to a continually updated "learned" chiller surge surface so as to realize minimum overall chiller energy consumption. The control system of the present invention includes a microprocessor having a random-access memory for storing an updated current surge surface during the "learning" mode. Further, during the "operating" mode the compressor speed is set at a safety margin away from the current surge speed surface.

While there has been illustrated and described what is at present to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out this invention, but that the invention will include all embodiments falling within the scope of the appended claims.

TABLE I
APPENDIX

| REGION OF SYSTEM CONTROL | LEARNING MODE COMPR. SPEED | LEARNING MODE PRV | OPERATING MODE COMPR. SPEED | OPERATING MODE PRV |
|---|---|---|---|---|
| Wide Open Vane "WOV" | No "Learning" mode. A surge is possible as chiller load decreases, forcing as entry into the surge an functional | | Chilled water controlled by Speed | Held open |
| Party Open Vane "POV" | Decremented in Steps until surge occurs | Chilled water controlled by PRV | Interpolation of latest surge surface functional and safety factor | Chilled water controlled by PRV |

TABLE II
APPENDIX
INITIAL SURGE SPEED ARRAY

| 1.80 J=1 | 2.00 2 | 2.10 3 | 2.20 4 | 2.30 5 | 2.40 6 | 2.50 7 | 2.60 8 | 2.80 9 | 3.10 10 | 3.60=PCD/PEV 11 | PRV |
|---|---|---|---|---|---|---|---|---|---|---|---|
| 9.06 | 9.58 | 9.82 | 9.99 | 9.99 | 9.99 | 9.99 | 9.99 | 9.99 | 9.99 | 9.99 | 2.00 |
| 8.66 | 9.13 | 9.42 | 9.65 | 9.86 | 9.99 | 9.99 | 9.99 | 9.99 | 9.99 | 9.99 | 2.50 |
| 8.33 | 8.85 | 9.08 | 9.32 | 9.53 | 9.74 | 9.96 | 9.99 | 9.99 | 9.99 | 9.99 | 3.00 |
| 8.13 | 8.65 | 8.83 | 9.12 | 9.33 | 9.54 | 9.76 | 9.94 | 9.99 | 9.99 | 9.99 | 3.33 |
| 7.93 | 8.45 | 8.63 | 8.92 | 9.13 | 9.34 | 9.56 | 9.74 | 9.99 | 9.99 | 9.99 | 3.67 |
| 7.73 | 8.25 | 8.43 | 8.72 | 8.93 | 9.14 | 9.36 | 9.54 | 9.91 | 9.99 | 9.99 | 4.00 |
| 7.56 | 8.08 | 8.32 | 8.55 | 8.76 | 8.98 | 9.19 | 9.33 | 9.74 | 9.99 | 9.99 | 4.33 |
| 7.43 | 7.95 | 8.18 | 8.42 | 8.63 | 8.84 | 9.06 | 9.24 | 9.61 | 9.99 | 9.99 | 4.67 |
| 7.26 | 7.78 | 8.02 | 8.25 | 8.46 | 8.68 | 8.89 | 9.03 | 9.44 | 9.91 | 9.99 | 5.00 |
| 7.16 | 7.68 | 7.92 | 8.15 | 8.36 | 8.58 | 8.79 | 8.98 | 9.34 | 9.81 | 9.99 | 5.50 |
| 7.06 | 7.58 | 7.82 | 8.05 | 8.26 | 8.48 | 8.69 | 8.88 | 9.24 | 9.71 | 9.99 | 6.00 |
| 6.83 | 7.35 | 7.58 | 7.82 | 8.03 | 8.24 | 8.46 | 8.64 | 9.01 | 9.48 | 9.99 | 7.50 |
| 6.66 | 7.18 | 7.42 | 7.65 | 7.86 | 8.08 | 8.29 | 8.48 | 8.84 | 9.31 | 9.92 | 10.00 |

TABLE III
APPENDIX
TASK OUTLINE FOR SELF-OPTIMIZING CONTROL SYSTEM

TASK 0 - Base Initialization Task
(a) Performed only at system start up
(b) Reads Mach No. at 60 hz and a code to initialize the surge surface array or use the latest array learned for the chiller
(c) Initializes parameters for i/o filters, safety margins, etc.
(d) Resets surge detector after inverter reaches 60 hz
(e) Loops until inhibit vane logic from logic board permits vane movement
(f) Activates all periodic tasks for control, learning, detection of surge, etc.

TASK 1 - Normal Control of Compressor Speed
(a) Activated every .5 sec
(b) Computes incremental speed changes due to: (1) Water temperature error from set point, (2) Speed error from latest learned surge surface, (3) Presence of a closed switch to establish a 60 hz operating point
(c) Outputs new speed set point to inverter logic board TASK 2 - Normal Control of PRV Movement
(a) Activated every 10 sec
(b) Computes period for the PRV vane motor contacts to be closed depending on current PRV location and water temperature error TASK 3 - Test For Compressor Surge
(a) Activated every 1. sec
(b) Tests for the surge detector logic signal indicating the chiller is in a surging state
(c) Kills Tasks 1 and 2
(d) Activates a subroutine to exit from surge by increasing speed and reducing PRV position
(e) Activates a subroutine to update that surge in the stored surge surface array in the computer memory
(f) Reactivates Tasks 1 and 2

TASK 4 - Probes For Surge Surface
(a) Kills Tasks 1 and 2
(b) Locates start of surge surface probe in the stored array
(c) Increases PRV, if water temperature allows, by an increment if vanes are already not wide open
(d) Decreases speed, if speed is not at its minimum
(e) Reactivates Tasks 1 and 2 for normal control, if the PRV are at their maximum opening or if the speed is at its minimum, and updates the surge surface
(f) Continues looping of this task until tests of (e) are satisfied or the system surges TASK 5 - Defines and Activates TASK 4

TASK 6 - Reads and Filters Input Variables
(a) Activated every .5 sec

TABLE III-continued
APPENDIX
TASK OUTLINE FOR SELF-OPTIMIZING CONTROL SYSTEM (b) Reads and filters (via a first order lag with time constant of 2 sec): (1) Water set point temperature, (2) Actual water temperature, (3) Condenser pressure, (4) Evaporator pressure, (5) Compressor speed, (6) PRV position
(c) Computes the water temperature after a lead/lag control compensation software section

What is claimed is:

1. A self-optimizing, capacity control system for a refrigeration system, including a compressor, a condenser, and an evaporator, all connected in a closed refrigeration circuit, which compressor includes a plurality of adjustable inlet guide vanes, a motor connected to regulate the inlet guide vanes position, and an electrical variable speed motor connected to drive the compressor, said control system comprising:

means for sensing the absolute condenser pressure to generate a first signal;
   means for sensing the absolute evaporator pressure to generate a second signal;
   means for sensing the amplitude of the current flowing in the compressor drive motor to generate a third signal;
   means for sensing the actual speed of the compressor drive motor to generate a fourth signal;
   means for sensing the physical position of the inlet guide vanes to generate a fifth signal;
   means for sensing the temperature of the chilled water discharged from the evaporator to generate a sixth signal;
   means for sensing a temperature set point to generate a seventh signal; and
   microprocessor means responsive to said first through seventh signals to generate control signals to regulate automatically both the speed of the compressor drive motor and the position of the inlet guide vanes based upon a continually updated "learned" chiller surge surface so as to realize a minimum overall chiller energy consumption.

2. A self-optimizing, capacity control system for a refrigeration system including a compressor, a condenser, and an evaporator, all connected in a closed refrigeration circuit, which compressor includes a plurality of adjustable inlet guide vanes, a motor connected to regulate the inlet guide vanes position and an electrical variable speed motor to drive the compressor, said control system comprising:

means for generating a first signal which is a function of the ratio of the absolute condenser pressure and the absolute evaporator pressure to define a compressor head signal;
   means for generating a second signal which is a function of the amplitude of the current flowing in the compressor drive motor to define a motor current signal;
   means for generating a third signal which is a function of the actual speed of the compressor drive motor to define a motor speed signal; and
   microprocessor means responsive to said compressor head signal, motor current signal, and motor speed signal for generating control signals to automatically adjust both the speed of the compressor speed drive motor and the inlet guide vanes based upon a continually updated "learned" chiller surge surface so as to utilize minimal overall chiller energy consumption.

3. A method for controlling a refrigeration system having a compressor, a condenser, and an evaporator, all connected in an enclosed refrigeration circuit, which compressor includes a plurality of adjustable inlet guide vanes, a motor connected to regulate the inlet guide vanes position and an electrical variable speed motor connected to drive the compressor, said method comprising the steps of:

sensing the absolute condenser pressure to generate the first signal;
   sensing the absolute evaporator pressure to generate a second signal;
   sensing the amplitude of the current flowing in the compressor drive motor to generate a third signal;
   sensing the actual speed of the compressor drive motor to generate a fourth signal;
   sensing the physical position of the inlet guide vanes to generate a fifth signal;
   sensing the temperature of the chilled water discharged from the evaporator to generate a sixth signal;
   sensing a temperature set point to generate a seventh signal; and
   generating control signals in response to the first through seventh signals to regulate automatically both the speed of the compressor drive motor and the position of the inlet guide vanes based upon a continually updated "learned" chiller surge surface so as to realize minimal overall chiller energy consumption.

4. A self-optimizing, capacity control system for a refrigeration system, including a compressor, a condenser, and an evaporator, all connected in a closed refrigeration circuit, which compressor includes a plurality of adjustable inlet guide vanes, a motor connected to regulate the inlet guide vanes position, and an electrical variable speed motor connected to drive the compressor, said control system comprising:

means for sensing the absolute condenser pressure to generate a first signal;
   means for sensing the absolute evaporator pressure to generate a second signal;
   means for sensing the amplitude of the current flowing in the compressor drive motor to generate a third signal;
   means for sensing the actual speed of the compressor drive motor to generate a fourth signal;
   means for sensing the physical position of the inlet guide vanes to generate a fifth signal;
   means for sensing the temperature of the chilled water discharged from the evaporator to generate a sixth signal;
   means for sensing a temperature set point to generate a seventh signal; and
   microprocessor means responsive to said first through seventh signals to generate control signals to regulate automatically both the speed of the compressor drive motor and the position of the inlet guide vanes based upon a continually updated "learned" chiller surge surface so as to realize a minimum overall chiller energy consumption,
   said microprocessor means determining both the compressor speed and the position of the inlet guide vanes to define a current operating point in an initial surge surface array stored in a random-access memory, and including means for initiating a "learning" mode in which the compressor motor speed is decreased incrementally and the inlet guide vanes are moved to a more open position to define a second operating point, said microprocessor means determining whether said compressor is surging at said second operating point.

5. A capacity control system as claimed in claim 4, wherein said microprocessor means includes means for continually decreasing incrementally the compressor drive motor speed and opening more of the vanes until an operating point is found where said compressor is surging, said microprocessor means updating the initial surge surface array stored in the random-access memory with the latest surge conditions.

6. A capacity control system as claimed in claim 5, wherein said microprocessor means includes means for initiating an "operating" mode in which the guide vanes are moved in response to a temperature error signal related to the difference between the sixth and seventh signals and said compressor speed is set at a safety margin from the surge speed.

7. A self-optimizing, capacity control system for a refrigeration system including a compressor, a condenser, and an evaporator, all connected in a closed refrigeration circuit, which compressor includes a plurality of adjustable inlet guide vanes, a motor connected to regulate the inlet guide vanes position and an electrical variable speed motor to drive the compressor, said control system comprising:

means for generating a first signal which is a function of the ratio of the absolute condenser pressure and the absolute evaporator pressure to define a compressor head signal;

means for generating a second signal which is a function of the amplitude of the current flowing in the compressor drive motor to define a motor current signal;

means for generating a third signal which is a function of the actual speed of the compressor drive motor to define a motor speed signal; and microprocessor means responsive to said compressor head signal, motor current signal, and motor speed signal for generating control signals to automatically adjust both the speed of the compressor speed drive motor and the inlet guide vanes based upon a continually updated "learned" chiller surge surface so as to utilize minimal overall chiller energy consumption, said microprocessor means determining both the compressor speed and the position of the inlet guide vanes to define a current operating point in an initial surge surface array stored in a random-access memory, and including means for initiating a "learning" mode in which the compressor motor speed is decreased incrementally and the inlet guide vanes are moved to a more open position to define a second operating point, said microprocessing means determining whether said compressor is surging at said second operating point.

8. A capacity control system as claimed in claim 7, wherein said microprocessor means includes means for continually decreasing incrementally the compressor drive motor speed and opening more of the vanes until an operating point is found where said compressor is surging, said microprocessor means updating the initial surge surface array stored in the random-access memory with the latest surge conditions.

9. A capacity control system as claimed in claim 8, wherein said microprocessor means includes means for initiating an "operating" mode in which the guide vanes are moved in response to a temperature error signal related to the difference between a chilled water temperature and a temperature set point and said compressor speed is set at a safety margin away from the surge speed.

10. A method for controlling a refrigeration system having a compressor, a condenser, and an evaporator, all connected in an enclosed reftigeration circuit, which compressor includes a plurality of adjustable inlet guide vanes, a motor connected to regulate the inlet guide vanes position and an electrical variable speed motor connected to drive the compressor, said method comprising the steps of:

sensing the absolute condenser pressure to generate a first signal;

sensing the absolute evaporator pressure to generate a second signal;

sensing the amplitude of the current flowing in the compressor drive motor to generate a third signal;

sensing the actual speed of the compressure drive motor to generate a fourth signal;

sensing the physical position of the inlet guide vanes to generate a fifth signal;

sensing the temperature of the chilled water discharged from the evaporator to generate a sixth signal;

sensing a temperature set point to generate a seventh signal; and generating control signals in response to the first through seventh signals to regulate automatically both the speed of the compressor drive motor and the position of the inlet guide vanes based upon a continually updated "learned" chiller surge surface so as to realize minimal overall chiller energy consumption, and further comprising the steps of determining both the compressor speed and the position of the inlet guide vanes to define a current operating point in an initial surge surface array stored in a random-access memory in response to the first through seventh signals, and initiating a "learning" mode in which the compressor motor speed is decreased incrementally and the inlet guide vanes are moved to a more open position to define a second operating point, and determining whether said compressor is surging at said second operating point.

11. A method for controlling a refrigeration system as claimed in claim 10, further comprising the steps of continually decreasing incrementally the compressor drive motor speed and opening more of the vanes until an operating point is found where said compressor is surging, and updating the initial surge surface array stored in the random-access memory with the latest surge conditions.

12. A method for controlling a refrigeration system as claimed in claim 11, further comprising the step of initiating an "operating" mode in which the guide vanes are moved in response to a temperature error signal related to the difference between the sixth and seventh signals and said compressor speed is set at a safety margin away from the surge speed.

* * * * *